J. R. GATES.
Grain Meter.

No. 22,603.

Patented Jan. 11, 1859.

UNITED STATES PATENT OFFICE.

JOSEPH R. GATES, OF INDIANAPOLIS, INDIANA, ASSIGNOR TO HIMSELF, AND ALEXR. COREY, OF SHELBYVILLE, INDIANA.

AUTOMATIC GRAIN-SCALE.

Specification of Letters Patent No. 22,603, dated January 11, 1859.

*To all whom it may concern:*

Be it known that I, JOSEPH R. GATES, of Indianapolis, in the county of Marion and State of Indiana, have invented a new and Improved Automatic Grain-Scale, of which the following is a full and exact description, reference being had to the accompanying drawings and the letters of reference marked thereon.

Figure 1:
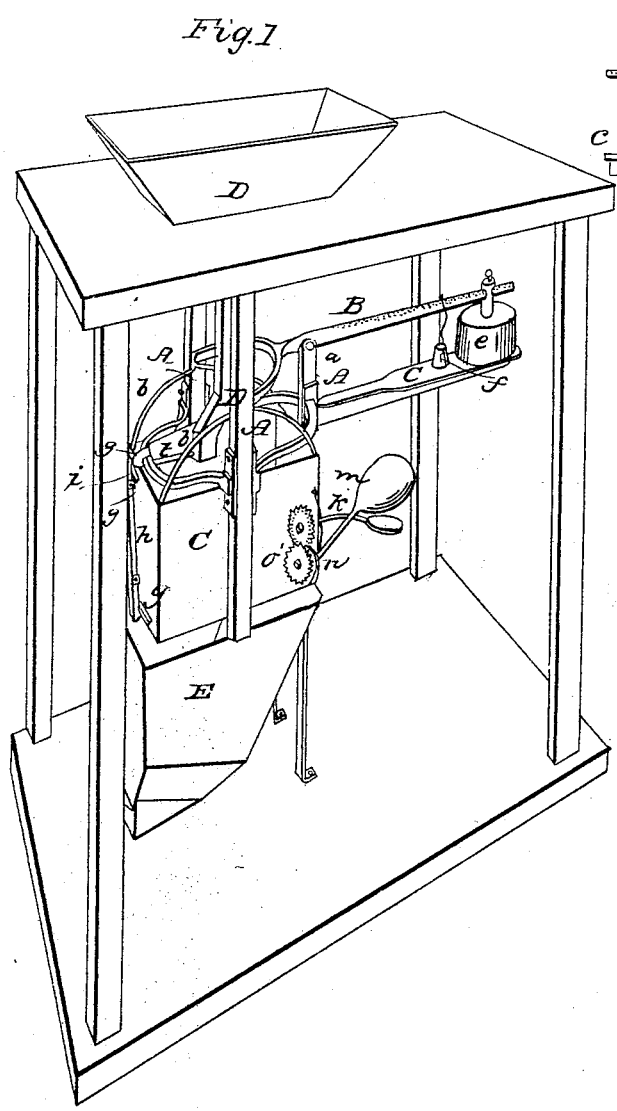
Figure 2:
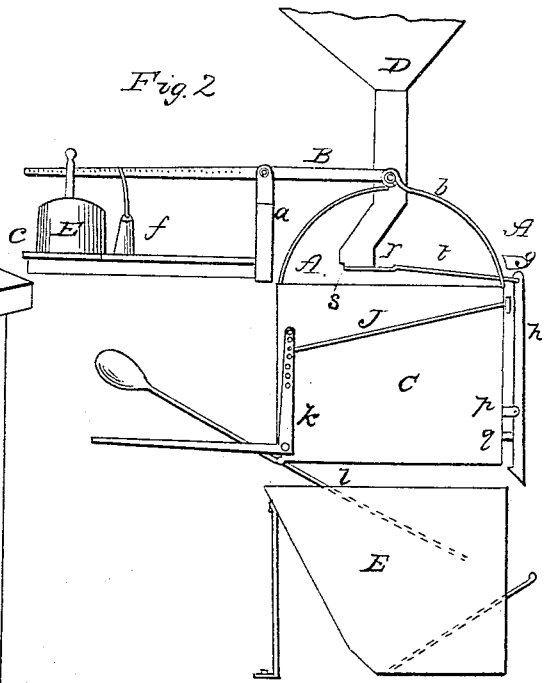
Figure 3:
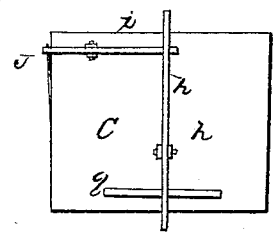

Figure 1 is a perspective and Figs. 2 and 3 are sectional views, showing the construction and operation of the scale.

A is a frame made fast to the ceiling.

B is a scale beam whose fulcrum operates in the upright post or fulcrum bearer $a$.

C is a scale box or scoop suspended from the beam B, by the bales $b$, $b$.

Attached to the frame A is the platform $c$ (upon which the weights, $e$, and $f$, rest,) and the projection $g$ forming an inclined plane upon which the lever $h$ slides.

$i$ is a lever designed to operate the lever $h$ by means of the connecting rod $j$ which is operated by the elbow lever $k$.

$l$ is a hinged bottom which is closed by the weight and spring $m$, and latched or held fast by the lever $h$.

$n$, is a pull designed to operate the ratchet of the indicator $o$. The pull $n$, is attached to the hinged bottom $l$.

The lever $h$ is fulcrumed at $p$, and adjusted by the spring $q$ for the purpose of forcing in the slide $r$, by means of the pitman $t$, and cutting off the flow of the grain.

D is a hopper and spout at the bottom of which are the slide $r$ and brush $s$.

E is a hopper or receiver into which the grain is discharged from the scale box C.

The following is the operation of the scale: The grain being passed into the hopper and spout D, passes into the scale box C, until the weight of the grain in the same is sufficient to raise the large weight $e$. As the scale box C descends the lever $h$, sliding upon the inclined projection $g$, partially closes the spout D, lessening the stream of grain until a weight sufficient to balance the small weight $f$, passes into the scale box C, when it descends allowing the spring $q$ to force the lever $h$ to operate the slide $r$, by means of the pitman $t$, thereby cutting off the flow of grain entirely. As the slide $r$, closes the spout D it rests against the brush $s$, which yields to anything that might otherwise check the operation or the entire closing of the valve or slide $r$. The projection upon the lower end of the lever $h$ being moved out at the same time relieves the hinged bottom $l$ allowing it to open down into the receiver E, a portion of grain remaining upon it until it is gradually discharged from the receiver E, when the weight and spring $m$ again close the hinged bottom $l$, the spring allowing the ball to descend upon the elbow lever $k$. By means of the connecting rod $j$ and lever $i$ the lever $h$ withdraws the slide $r$ at the same time that the lower projection upon the lever $h$ passing under the hinged bottom $l$ holds it in place until another draft has passed into the scale box C. As the hinged bottom $l$ opens or descends the pull $n$ is withdrawn from the notch in the indicator $o$, and as the bottom is again closed the pull falls into the succeeeding notch thereby revolving the indicator $o$ for the purpose of showing the number of drafts weighed, as at each draft the bottom $l$ must open and close.

What I claim and desire to secure by Letters Patent, is—

1. The lever $h$ and spring $q$ when used for the treble purpose of operating the cutoff gate $r$, discharging or loosening the bottom valve $l$ and preventing the weights $e$ and $f$, from raising the scale box C, and drawing the slide $r$ until the bottom $l$ is closed; thereby regulating the cutoff and flow of grain without using the weight of the grain while the same is being weighed.

2. The combination and arrangement of the spring and weight $m$, with the elbow lever $k$ connecting rod $j$ and lever $i$ when constructed and operated substantially as and for the purposes set forth.

J. R. GATES.

Witnesses:
   H. W. ELLSWORTH,
   JOHN H. REDSTONE.